United States Patent
Rönneke et al.

(10) Patent No.: US 12,324,029 B2
(45) Date of Patent: Jun. 3, 2025

(54) CONFIGURATION OF DOWNLINK DATA MEASUREMENT AT MOBILE TERMINATING EARLY DATA TRANSMISSION (MT-EDT)

(71) Applicant: Telefonaktiebolaget LM Ericsson (publ), Stockholm (SE)

(72) Inventors: Hans Bertil Rönneke, Kungsbacka (SE); Paul Schliwa-Bertling, Ljungsbro (SE); Qian Chen, Mölndal (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 13 days.

(21) Appl. No.: 17/768,944

(22) PCT Filed: Oct. 15, 2020

(86) PCT No.: PCT/IB2020/059728
§ 371 (c)(1),
(2) Date: Apr. 14, 2022

(87) PCT Pub. No.: WO2021/074859
PCT Pub. Date: Apr. 22, 2021

(65) Prior Publication Data
US 2024/0107593 A1 Mar. 28, 2024

Related U.S. Application Data

(60) Provisional application No. 62/916,050, filed on Oct. 16, 2019.

(51) Int. Cl.
*H04W 76/10* (2018.01)
*H04W 28/02* (2009.01)
*H04W 28/16* (2009.01)

(52) U.S. Cl.
CPC ....... *H04W 76/10* (2018.02); *H04W 28/0252* (2013.01); *H04W 28/16* (2013.01)

(58) Field of Classification Search
CPC . H04W 76/10; H04W 28/0252; H04W 60/00; H04W 28/16; H04W 60/02
See application file for complete search history.

(56) References Cited

U.S. PATENT DOCUMENTS 12,016,059 B2 * 6/2024 Kim ...................... H04W 76/30
2019/0075586 A1 * 3/2019 Xu ..................... H04W 72/1221
(Continued)

OTHER PUBLICATIONS

International Search Report and Written Opinion dated Jan. 12, 2021 issued in PCT Application No. PCT/IB2020/059728, consisting of 16 pages.
(Continued)

*Primary Examiner* — Redentor Pasia
(74) *Attorney, Agent, or Firm* — Weisberg I.P. Law, P.A.

(57) ABSTRACT

Apparatuses and methods for configuration of downlink data measurement at mobile terminating early data transmission (MT-EDT) are provided. In one embodiment, a method implemented at a network node includes determining whether to measure a size of downlink data for a mobile terminating early data transmission, MT-EDT, procedure associated with a user equipment, UE; as a result of the determination, obtaining a measurement of the size of the downlink data; and optionally, sending the measurement of the size of the downlink data to a second network node.

17 Claims, 8 Drawing Sheets

(56) References Cited

U.S. PATENT DOCUMENTS

| | | | |
|---|---|---|---|
| 2020/0053795 A1* | 2/2020 | Lin | H04W 72/23 |
| 2021/0099912 A1* | 4/2021 | Zhang | H04L 1/0002 |
| 2021/0105837 A1* | 4/2021 | Lee | H04W 68/00 |
| 2021/0289469 A1* | 9/2021 | Liu | H04W 8/24 |
| 2022/0053572 A1* | 2/2022 | Pham Van | H04W 74/0841 |
| 2022/0104169 A1* | 3/2022 | Kim | H04W 76/27 |
| 2022/0167438 A1* | 5/2022 | Shrestha | H04W 68/02 |
| 2022/0201744 A1* | 6/2022 | Shrestha | H04W 76/27 |

OTHER PUBLICATIONS

3GPP TSG RAN WG2 Meeting #107bis; R2-1912856; Source: Intel Corporation; Title: Remaining issues in MT EDT for UP solution; Agenda Item: 7.1.2; Document for: Discussion and Decision, Chongqing, China, Oct. 14-18, 2019, consisting of 4 pages.

SA WG2 Meeting #S2-135; S2-1908901; Source: OPPO; Title: Discussion on supporting MT-EDT; Agenda Item: 7.4; Discussion for: Discussion and agreement, Split, Croatia, Oct. 14-18, 2019, consisting of 4 pages.

SA WG2 Meeting #135; S2-1909740 (was S2-19xxxx); Source: Qualcomm Incorporated; Title: MT-EDT procedure based on message 4 solution; Agenda Item: 7.4; Document for: Discussion, Split, Croatia, Oct. 14-18, 2019, consisting of 4 pages.

3GPP TSG-SA WG2 Meeting #135; S2-1909741 (revision of S2-19xxxxx); Source to WG: Qualcomm Incorporated; Source to TSG: SA2; Title: MT-EDT introduction; Work item code: TEI16; Category: F, Split, Croatia, Oct. 14-18, 2019, consisting of 4 pages.

3GPP TSG-SA WG3 Meeting #96; S3-192582; Source: Nokia, Nokia Shanghai Bell; Title: Discussion paper on S2-1908629 LS on Mobile-terminated Early Data Transmission (S2-1906862 / R2-1905276); Agenda Item: 6.1; Document for: Discussion and Endorse, Wroclaw, Poland, Aug. 26-30, 2019, consisting of 2 pages.

3GPP TS 23.401 V16.4.0 (Sep. 2019) 3rd Generation Partnership Project; Technical Specification Group Services and System Aspects; General Packet Radio Service (GPRS) enhancements for Evolved Universal Terrestrial Radio Access Network (E-UTRAN) access (Release 16), consisting of 424 pages.

3GPP TS 23.502 V16.1.1 (Jun. 2019) 3rd Generation Partnership Project; Technical Specification Group Services and System Aspects; Procedures for the 5G System; Stage 2 (Release 16), consisting of 495 pages.

3GPP TS 36.300 V15.7.0 (Sep. 2019) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), consisting of 365 pages.

* cited by examiner

CONFIGURATION OF DOWNLINK DATA MEASUREMENT AT MOBILE TERMINATING EARLY DATA TRANSMISSION (MT-EDT)

CROSS-REFERENCE TO RELATED APPLICATIONS

This application is a Submission Under 35 U.S.C. § 371 for U.S. National Stage Patent Application of International Application No. PCT/IB2020/059728, filed Oct. 15, 2020 entitled "CONFIGURATION OF DOWNLINK DATA MEASUREMENT AT MOBILE TERMINATING EARLY DATA TRANSMISSION (MT-EDT)," which claims priority to U.S. Provisional Application No. 62/916050, filed Oct. 16, 2019, entitled "CONFIGURATION OF DOWNLINK DATA MEASUREMENT AT MOBILE TERMINATING EARLY DATA TRANSMISSION (MT-EDT)," the entireties of both of which are incorporated herein by reference.

TECHNICAL FIELD

Wireless communication and in particular, methods and apparatuses for configuration of downlink data measurement at mobile terminating early data transmission (MT-EDT).

BACKGROUND

To support the power saving of Internet-of-Things (IoT) devices, there are different methods that have been considered in the Third Generation Partnership Project (3GPP) for, e.g., cellular IoT (CIoT) in the Evolved Packet System (EPS) and in 5th Generation Core (5GC). For example, one of the methods is to transmit downlink data as part of radio resource control (RRC) signaling between a user equipment (UE) and a base station (e.g., eNodeB or next generation radio access network (NG-RAN)) (both referred to herein as RAN). This may be referred to as mobile terminating early data transmission (MT-EDT).

There may be two types of data transmission optimization for IoT, Control Plane (CP) and User Plane (UP). This disclosure considers at least the User Plane Transmission and User Plan Function (UPF) anchored (SGi terminated) Control Plane transmission. For User Plane data transmission, the early data transmission (EDT) is specified in 3GPP Technical Specification (TS) 36.300 clause 7.3b.3. For Control Plane data transmission, the EDT is specified in 3GPP TS 36.300 clause 7.3b.2 and TS 23.401 clause 5.3.4B.

The procedures for determining when the MT-EDT may or may not be used are being considered by bodies such as the 3GPP.

SUMMARY

Some embodiments advantageously provide methods and apparatuses for configuration of downlink data measurement at mobile terminating early data transmission (MT-EDT).

According to one aspect of the present disclosure, a method implemented in a network node includes sending a downlink data size measurement indication, the downlink data size measurement indication indicates to measure a downlink data size for a mobile terminating early data transmission (MT-EDT) procedure.

According to another aspect of the present disclosure, a method implemented in network node includes receiving a downlink data size measurement indication, the downlink data size measurement indication indicates to measure a downlink data size for a mobile terminating early data transmission (MT-EDT) procedure.

According to an aspect of the present disclosure, a method implemented in a network node is provided. The method includes determining whether to measure a size of downlink data for a mobile terminating early data transmission, MT-EDT, procedure associated with a user equipment, UE; as a result of the determination, obtaining a measurement of the size of the downlink data; and optionally, sending the measurement of the size of the downlink data to a second network node.

In some embodiments of this aspect, determining whether to measure the size of the downlink data for the UE comprises determining whether to measure the size of the downlink data associated with the UE based at least in part on at least one of a policy, a subscription parameter associated with the UE and a traffic profile in the subscription parameter indicating a single packet transmission for the UE. In some embodiments of this aspect, obtaining the measurement of the size of the downlink data comprises sending a downlink data size measurement indication, the downlink data size measurement indication indicating to measure the size of the downlink data associated with the UE; and as a result of sending the downlink data size measurement indication, receiving the measurement of the size of the downlink data from a third network node.

In some embodiments of this aspect, the third network node is a serving gateway node and the network node is a mobility management entity, MME, node. In some embodiments of this aspect, the third network node is a session management function, SMF, node and the network node is an access and mobility management function, AMF, node. In some embodiments of this aspect, the measurement of the size of the downlink data associated with the UE is performed one of: at the third network node; and as a result of a configuration by the third network node to perform the measurement at a fourth network node, the fourth network node being a user plane function, UPF, node. In some embodiments of this aspect, obtaining the measurement of the size of the downlink data comprises sending a downlink data size measurement indication in a create session request message.

In some embodiments of this aspect, obtaining the measurement of the size of the downlink data comprises: sending a downlink data size measurement indication in a packet data unit, PDU, session establishment procedure message; and the PDU session establishment procedure message includes at least one of a create session management context message, an update session management context message, a session establishment request message and a session modification request message. In some embodiments of this aspect, sending the measurement of the size of the downlink data to the second network node comprises sending the measurement of the size of the downlink data to a radio access network, RAN, node.

In some embodiments of this aspect, at least one of: the size of the downlink data being used at a radio access network, RAN, node to determine whether to indicate to the UE to perform the MT-EDT procedure; and the MT-EDT procedure being a radio resource control, RRC, procedure.

According to yet another aspect of the present disclosure, a method implemented in a network node is provided. The method includes determining whether to measure a size of downlink data for a mobile terminating early data transmission, MT-EDT, procedure associated with a user equipment, UE; as a result of determining to measure the size of downlink data associated with the UE, obtaining a measurement of the size of the downlink data; and sending the measurement of the size of the downlink data to a second network node.

In some embodiments of this aspect, determining whether to measure the size of the downlink data associated with the UE comprises receiving a downlink data size measurement indication, the downlink data size measurement indication indicating to measure the size of the downlink data associated with the UE; and the measurement of the size of the downlink data is based at least in part on at least one of a policy, a subscription parameter associated with the UE and a traffic profile in the subscription parameter indicating a single packet transmission for the UE. In some embodiments of this aspect, the network node is a serving gateway node and the downlink data size measurement indication is received in one of a create session request message and an update session request message from a mobility management entity, MME, node.

In some embodiments of this aspect, the network node is a session management function, SMF, node and the downlink data size measurement indication is received in one of a packet data unit, PDU, session establishment procedure message and a packet data unit, PDU, session modification procedure message from an access and mobility management function, AMF, node. In some embodiments of this aspect, the size of the downlink data being used by a radio access node, RAN, to determine use of the MT-EDT procedure. In some embodiments of this aspect, obtaining the measurement of the size of the downlink data comprises, as a result of determining to measure the size of downlink data associated with the UE, one of measuring the size of the downlink data received from a Packet Data Network, PDN, gateway for the UE and configuring a third network node to measure the size of the downlink data received from the PDN gateway for the UE.

In some embodiments of this aspect, measuring the size of the downlink data comprises measuring the size of the downlink data associated with the UE as a result of a user plane interface not being active for the UE. In some embodiments of this aspect, the user plane interface is one of an S1-U interface and a N3 interface. In some embodiments of this aspect, sending the measurement of the size of the downlink data to the second network node comprises sending the measurement of the size of the downlink data in a downlink data notification, DDN, request to a mobility management node. In some embodiments of this aspect, the size of the downlink data being used at a radio access network, RAN, node to determine whether to indicate to the UE to perform the MT-EDT procedure; and the MT-EDT procedure being a radio resource control, RRC, procedure.

According to another aspect of the present disclosure, a network node includes processing circuitry. The processing circuitry is configured to cause the network node to: determine whether to measure a size of downlink data for a mobile terminating early data transmission, MT-EDT, procedure associated with a user equipment, UE; as a result of the determination, obtain a measurement of the size of the downlink data; and optionally, send the measurement of the size of the downlink data to a second network node.

In some embodiments of this aspect, the processing circuitry is configured to cause the network node to determine whether to measure the size of the downlink data for the UE by being configured to cause the network node to: determine whether to measure the size of the downlink data associated with the UE based at least in part on at least one of a policy, a subscription parameter associated with the UE and a traffic profile in the subscription parameter indicating a single packet transmission for the UE.

In some embodiments of this aspect, the processing circuitry is configured to cause the network node to obtain the measurement of the size of the downlink data by being configured to cause the network node to: send a downlink data size measurement indication, the downlink data size measurement indication indicating to measure the size of the downlink data associated with the UE; and as a result of sending the downlink data size measurement indication, receive the measurement of the size of the downlink data from a third network node.

In some embodiments of this aspect, the third network node is a serving gateway node and the network node is a mobility management entity, MME, node. In some embodiments of this aspect, the third network node is a session management function, SMF, node and the network node is an access and mobility management function, AMF, node. In some embodiments of this aspect, the measurement of the size of the downlink data associated with the UE is performed one of: at the third network node; and as a result of a configuration by the third network node to perform the measurement at a fourth network node, the fourth network node being a user plane function, UPF, node.

In some embodiments of this aspect, the processing circuitry is configured to cause the network node to obtain the measurement of the size of the downlink data by being configured to cause the network node to: send a downlink data size measurement indication in a create session request message. In some embodiments of this aspect, the processing circuitry is configured to cause the network node to obtain the measurement of the size of the downlink data by being configured to cause the network node to: send a downlink data size measurement indication in a packet data unit, PDU, session establishment procedure message; and the PDU session establishment procedure message includes at least one of a create session management context message, an update session management context message, a session establishment request message and a session modification request message.

In some embodiments of this aspect, the processing circuitry is configured to cause the network node to send the measurement of the size of the downlink data to the second network node by being configured to cause the network node to: send the measurement of the size of the downlink data to a radio access network, RAN, node. In some embodiments of this aspect, the size of the downlink data is used at a radio access network, RAN, node to determine whether to indicate to the UE to perform the MT-EDT procedure; and the MT-EDT procedure is a radio resource control, RRC, procedure.

According to yet another aspect of the present disclosure, a network node includes processing circuitry. The processing circuitry is configured to cause the network node to: determine whether to measure a size of downlink data for a mobile terminating early data transmission, MT-EDT, procedure associated with a user equipment, UE; as a result of determining to measure the size of downlink data associated with the UE, obtain a measurement of the size of the downlink data; and send the measurement of the size of the downlink data to a second network node.

In some embodiments of this aspect, the processing circuitry is configured to cause the network node to determine whether to measure the size of the downlink data associated with the UE by being configured to cause the network node to: receive a downlink data size measurement indication, the downlink data size measurement indication indicating to measure the size of the downlink data associated with the UE; and the measurement of the size of the downlink data is based at least in part on at least one of a policy, a subscription parameter associated with the UE and a traffic profile in the subscription parameter indicating a single packet transmission for the UE. In some embodiments of this aspect, the network node is a serving gateway node and the downlink data size measurement indication is received in one of a create session request message and an update session request message from a mobility management entity, MME, node. In some embodiments of this aspect, the network node is a session management function, SMF, node and the downlink data size measurement indication is received in one of a packet data unit, PDU, session establishment procedure message and a packet data unit, PDU, session modification procedure message from an access and mobility management function, AMF, node.

In some embodiments of this aspect, the size of the downlink data being used by a radio access node, RAN, to determine use of the MT-EDT procedure. In some embodiments of this aspect, the processing circuitry is configured to cause the network node to obtain the measurement of the size of the downlink data by being configured to cause the network node to: as a result of determining to measure the size of downlink data associated with the UE, one of measure the size of the downlink data received from a Packet Data Network, PDN, gateway for the UE and configure a third network node to measure the size of the downlink data received from the PDN gateway for the UE. In some embodiments of this aspect, the processing circuitry is configured to cause the network node to measure the size of the downlink data by being configured to cause the network node to: measure the size of the downlink data associated with the UE as a result of a user plane interface not being active for the UE.

In some embodiments of this aspect, the user plane interface is one of an S1-U interface and a N3 interface. In some embodiments of this aspect, the processing circuitry is configured to cause the network node to send the measurement of the size of the downlink data to the second network node by being configured to cause the network node to: send the measurement of the size of the downlink data in a downlink data notification, DDN, request to a mobility management node. In some embodiments of this aspect, the size of the downlink data being used at a radio access network, RAN, node to determine whether to indicate to the UE to perform the MT-EDT procedure; and the MT-EDT procedure being a radio resource control, RRC, procedure.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
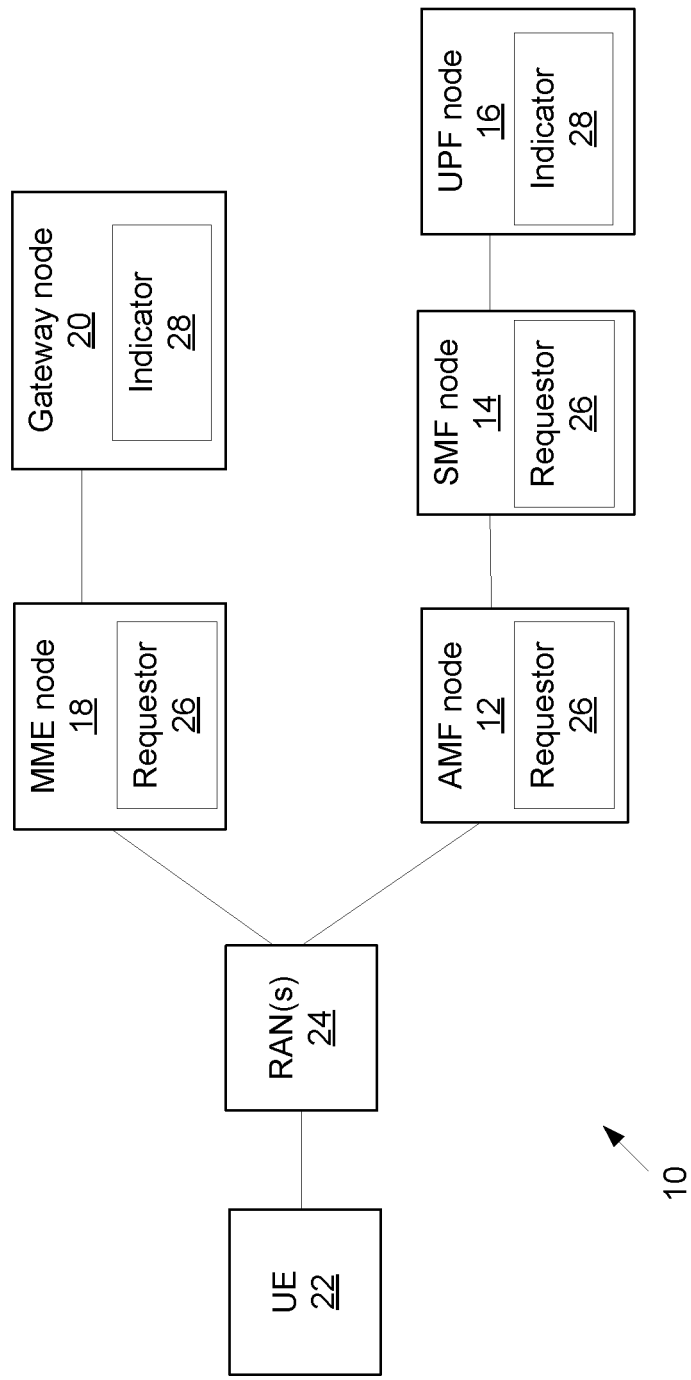
FIG. 1 illustrates another example system architecture according to some embodiments of the present disclosure.

Various methods are considered for determining when exactly the MT-EDT may be used. For example, MT-EDT may not be able to be used when multiple data packets are transmitted between the UE and the RAN, but rather only for single downlink (DL) data packet (and potentially also a single subsequent uplink (UL) data packet). It may be considered to use a subscription parameter, the Traffic Profile, and only apply MT-EDT if the Traffic Profile in the Subscription is set to "single packet transmission (DL)".

Some of the proposals for determining when MT-EDT may be used have drawbacks. For example, one proposal includes letting the serving gateway (SGW) and/or UPF and/or session management function (SMF) always provide the DL data size to the mobility management entity/access and mobility function (MME/AMF). However, this proposal may require extra resources in the SGW/UPF/SMF to measure the DL data size. Furthermore, this is not performed in existing products or standards.

Another proposal includes configuring a maximum DL data size in the SGW/UPF/SMF and allowing the SGW/UPF/SMF to only include the DL data size in the Downlink Data Notification (DDN) message to the MME/AMF when the received DL data are within the maximum DL data size. However, this proposal may basically apply MT-EDT every time the DL data size is sufficiently small. One problem with that is that often the DL data will be followed by subsequent data being sent both in UL and DL, and MT-EDT cannot be used for multiple data packet transmissions (only one DL packet and optionally potentially one subsequent UL packet).

In addition, using the Traffic Profile subscription parameter and applying MT-EDT when the Traffic Profile is set to "single packet transmission (DL)" can be selective for when MT-EDT is used (e.g., only for UE which only uses single packet transmissions (DL)); however, how the SGW/UPF/SMF may become aware that DL data size measurements should be made or not has not been considered.

This may be particularly useful if the DL data size being measured in the SGW, UPF or SMF is used as an indication in the MT-EDT procedure from the AMF/MME to the NG-RAN/eNodeB to indicate to the UE to start an MT-EDT RRC procedure.

Some embodiments of the present disclosure provide arrangements for how a network node, such as SGW/UPF/SMF, may become aware that it should make DL data size measurements for MT-EDT.

Some embodiments of the present disclosure may allow for the MT-EDT to be applied without wasting resources due to measuring the size of every DL data packet. Some embodiments of the present disclosure may allow the MT-EDT to be applied selectively only for the UE that has been configured in the subscription to use a traffic pattern where the MT-EDT can be applied.

Before describing in detail exemplary embodiments, it is noted that the embodiments reside primarily in combinations of apparatus components and processing steps related to configuration of downlink data measurement at mobile terminating early data transmission (MT-EDT). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting terms wireless device (WD) or a user equipment (UE) are used interchangeably. The UE herein can be any type of wireless device capable of communicating with a network node or another UE over radio signals. In some embodiments, the UE may be an autonomous machine configured to communicate via IMS. The UE herein can by any type of communication device capable of communicating with another UE, an application server, a network node, a server, an IMS NF or other IMS network node, via a wired connection and/or a wireless connection. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "node" is used herein and can be any kind of network node, such as, a mobility management node (e.g., Mobility Management Entity (MME) and/or Access and Mobility Function (AMF)), a gateway node (e.g., serving gateway), a session management node (e.g., session management function (SMF) node), a user plane function (UPF) node or any network node. In some embodiments, the network node may be, for example, a subscriber database node, a core network node, a Fifth Generation (5G) and/or New Radio (NR) network node, an Evolved Packet System (EPS) node, an Internet Protocol (IP) Multimedia Subsystem (IMS) node, a Network Function (NF) node, a Proxy-Call Session Control Function (P-CSCF) node, an Serving-CSCF node, an Interrogating-CSCF node, a network repository function (NRF) node, a unified data management (UDM) node, a home subscriber server (HSS) node, a home location register (HLR) node, etc.

In yet other embodiments, the network node may include any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB), donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

A node may include physical components, such as processors, allocated processing elements, or other computing hardware, computer memory, communication interfaces, and other supporting computing hardware. The node may use dedicated physical components, or the node may be allocated use of the physical components of another device, such as a computing device or resources of a datacenter, in which case the node is said to be virtualized. A node may be associated with multiple physical components that may be located either in one location, or may be distributed across multiple locations.

It should be understood that the indicator discussed in the present disclosure may have any name and should not be limited to the specific names used herein, which are exemplary and/or descriptive, such as, "downlink data measurement indication", since the indication may, for example, be given another name in a specification, even though the use/function is as disclosed in the present disclosure.

In some embodiments, the create session request message is a Create Session Request message in a 3GPP standard for EPS. In some embodiments, PDU may be a protocol data unit and/or packet data unit. In some embodiments, the create session management context message is a Nsmf-PDUSession_CreateSMContext message. In some embodiments, the update session management context message is a Nsmf-PDUSession_UpdateSMContext message. In some embodiments, the session establishment/modification request message is an N4 Session Establishment/Modification Request message. In some embodiments, the session/modification request message is a N4 Session/Modification Request message.

In some embodiments, the PDU is a Protocol Data Unit. In some embodiments, the PDU may be considered a Packet Data Unit.

In some embodiments, an S1-U interface and an N3 interface may be considered user plane interfaces for 4G/EPS and 5G, respectively. The terms "user plane interface" and S1-U and N3 may be used herein interchangeably in some embodiments.

In some embodiments, the data whose size is to be measured may be considered user data e.g., downlink user data. In other embodiments, the data may be other types of data. In some embodiments, the size may be measured in terms of amount/number of bits representing the data. In other embodiments, the size may be measured otherwise.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein. Signaling associated to an interface may be transmitted via the interface.

An indication (e.g., downlink data size measurement indication, etc.) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Even though the descriptions herein may be explained in the context of one of a Downlink (DL) and an Uplink (UL) data/transmission, it should be understood that the basic principles disclosed may also be applicable to the other of the one of the DL and the UL data/transmission.

Any two or more embodiments described in this disclosure may be combined in any way with each other.

Note also that some embodiments of the present disclosure may be supported by standard documents disclosed in Third Generation Partnership Project (3GPP) technical specifications. That is, some embodiments of the description can be supported by the above documents. In addition, all the terms disclosed in the present document may be described by the above standard documents.

Note that although terminology from one particular wireless system, such as, for example, $3^{rd}$ Generation Partnership Project (3GPP), Long Term Evolution (LTE), $5^{th}$ Generation (5G) (also known as New Radio (NR)), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a mobility management node (e.g., Mobility Management Entity (MME) and/or Access and Mobility Function (AMF)), a gateway node (e.g., serving gateway), a session management node (e.g., session management function (SMF) node) and a user plane function (UPF) node or any network node may be distributed over a plurality of such nodes. In other words, it is contemplated that the functions of the MME node, serving gateway node, SMF node, UPF node, SMF node and/or first and second network nodes described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures, in which like elements are referred to by like reference numerals, there is shown in FIG. 1 a schematic diagram of a communication system 10, according to another embodiment, constructed in accordance with the principles of the present disclosure. The communication system 10 in FIG. 1 is a non-limiting example and other embodiments of the present disclosure may be implemented by one or more other systems and/or networks. Referring to FIG. 1, the system 10 includes an AMF node 12, an SMF node 14, a UPF node 16. The system 10 may include an MME node 18 and a gateway node 20. The system 10 may further include a user equipment (UE) 22 and one or more radio access networks (RANs) 24. The RAN(s) 24 may include, e.g., 5G RAN also known as NR RAN, Long Term Evolution (LTE) RAN, etc.), which may provide radio access to the UE 22. The various nodes may support configuration of downlink data measurement for mobile terminating early data transmission (MT-EDT) procedures according to some embodiments of the present disclosure. It should be understood that the system 10 may include numerous nodes of those shown in FIG. 1, as well as additional nodes not shown in FIG. 1. In addition, the system 10 may include many more connections/interfaces than those shown in FIG. 1.

The system 10 may include one or more nodes having a requestor 26 and/or an indicator 28. In some embodiments, the requestor 26 may be configured to determine whether to measure a size of downlink data for a mobile terminating early data transmission, MT-EDT, procedure associated with a user equipment, UE; as a result of the determination, obtain a measurement of the size of the downlink data; and optionally, send the measurement of the size of the downlink data to a second network node. In some embodiments, the indicator 28 may be configured to determine whether to measure a size of downlink data for a mobile terminating early data transmission, MT-EDT, procedure associated with a user equipment, UE; as a result of determining to measure the size of downlink data associated with the UE, obtain a measurement of the size of the downlink data; and send the measurement of the size of the downlink data to a second network node.

In some embodiments, the requestor 26 may be configured to send a request message including a downlink data size measurement indication, the downlink data size measurement indication indicates to measure a downlink data size for a mobile terminating early data transmission (MT-EDT) procedure. The indicator 28 may be configured to receive an indication in a request message, such as by receiving a downlink data size measurement indication, the downlink data size measurement indication indicates to measure a downlink data size for a mobile terminating early data transmission (MT-EDT) procedure.

Example implementations, in accordance with some embodiments, of a first network node 30 and a second network node 32, which may include or by any of the network nodes (e.g., elements 12-20) discussed in the preceding paragraphs will now be described with reference to FIG. 2. The first network node 30 may be any of, for example, an AMF node 12, an SMF node 14, a UPF node 16, an MME node18 and/or a gateway node 20, etc. The second network node 32 may be any of, for example, an AMF node 12, an SMF node 14, a UPF node 16, an MME node 18 and/or a gateway node 20, etc. The first network node 30 may include a requestor 26 and the second network node 32 may include an indicator 28, which may allow the first network node 30 to send request messages and/or the second network node 32 to receive and understand the request messages having a downlink data measurement indicator to e.g., support configuration of downlink data measurement for mobile terminating early data transmission (MT-EDT) procedures according to some embodiments of the present disclosure.

The first network node 30 (e.g., an AMF node, an SMF node, a UPF node, an MME node and/or a gateway node, etc.) includes a communication interface 34, processing circuitry 36, and memory 38. The communication interface 34 may be configured to communicate with any of the nodes in the system 10 to send a request message including a downlink data measurement indicator to e.g., support configuration of downlink data measurement for MT-EDT procedures according to some embodiments of the present disclosure. In some embodiments, the communication interface 34 may be formed as or may include, for example, one or more radio frequency (RF) transmitters, one or more RF receivers, and/or one or more RF transceivers, and/or may be considered a radio interface. In some embodiments, the communication interface 34 may also include a wired interface.

The processing circuitry 36 may include one or more processors 40 and memory, such as, the memory 38. In particular, in addition to a traditional processor and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 40 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the first network node 30 may further include software stored internally in, for example, memory 38, or stored in external memory (e.g., database) accessible by the first network node 30 via an external connection. The software may be executable by the processing circuitry 36. The processing circuitry 36 may be configured to control any of the methods and/or processes described herein and/or to cause such methods, and/or processes to be performed, e.g., by the first network node 30 (e.g., an AMF node, an SMF node, a UPF node, an MME node and/or a gateway node, etc.). The memory 38 is configured to store data, programmatic software code and/or other information described herein. In some embodiments, the software may include instructions stored in memory 38 that, when executed by the processor 40 causes the processing circuitry 36 and/or configures the first network node 30 to perform the processes described herein with respect to the first network node 30 (e.g., an AMF node, an SMF node, a UPF node, an MME node and/or a gateway node, etc.).

The second network node 32 (e.g., an AMF node, an SMF node, a UPF node, an MME node and/or a gateway node, etc.) includes a communication interface 42, processing circuitry 44, and memory 46. The communication interface 42 may be configured to communicate with any of the nodes in the system 10 to receive a request message including a downlink data measurement indicator to e.g., support configuration of downlink data measurement for MT-EDT procedures according to some embodiments of the present disclosure. In some embodiments, the communication interface 42 may be formed as or may include, for example, one or more radio frequency (RF) transmitters, one or more RF receivers, and/or one or more RF transceivers, and/or may be considered a radio interface. In some embodiments, the communication interface 42 may also include a wired interface.

The processing circuitry 44 may include one or more processors 48 and memory, such as, the memory 46. In particular, in addition to a traditional processor and memory, the processing circuitry 44 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processors 48 may be configured to access (e.g., write to and/or read from) the memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the second network node 32 may further include software stored internally in, for example, memory 46, or stored in external memory (e.g., database) accessible by the second network node 32 via an external connection. The software may be executable by the processing circuitry 44. The processing circuitry 44 may be configured to control any of the methods and/or processes described herein and/or to cause such methods, and/or processes to be performed, e.g., by the second network node 32 (e.g., an AMF node, an SMF node, a UPF node, an MME node and/or a gateway node, etc.). The memory 46 is configured to store data, programmatic software code and/or other information described herein. In some embodiments, the software may include instructions stored in memory 46 that, when executed by the processors 48, causes the processing circuitry 44 and/or configures the network node 32 to perform the processes described herein with respect to the second network node 32 (e.g., an AMF node, an SMF node, a UPF node, an MME node and/or a gateway node, etc.).

Figure 2:
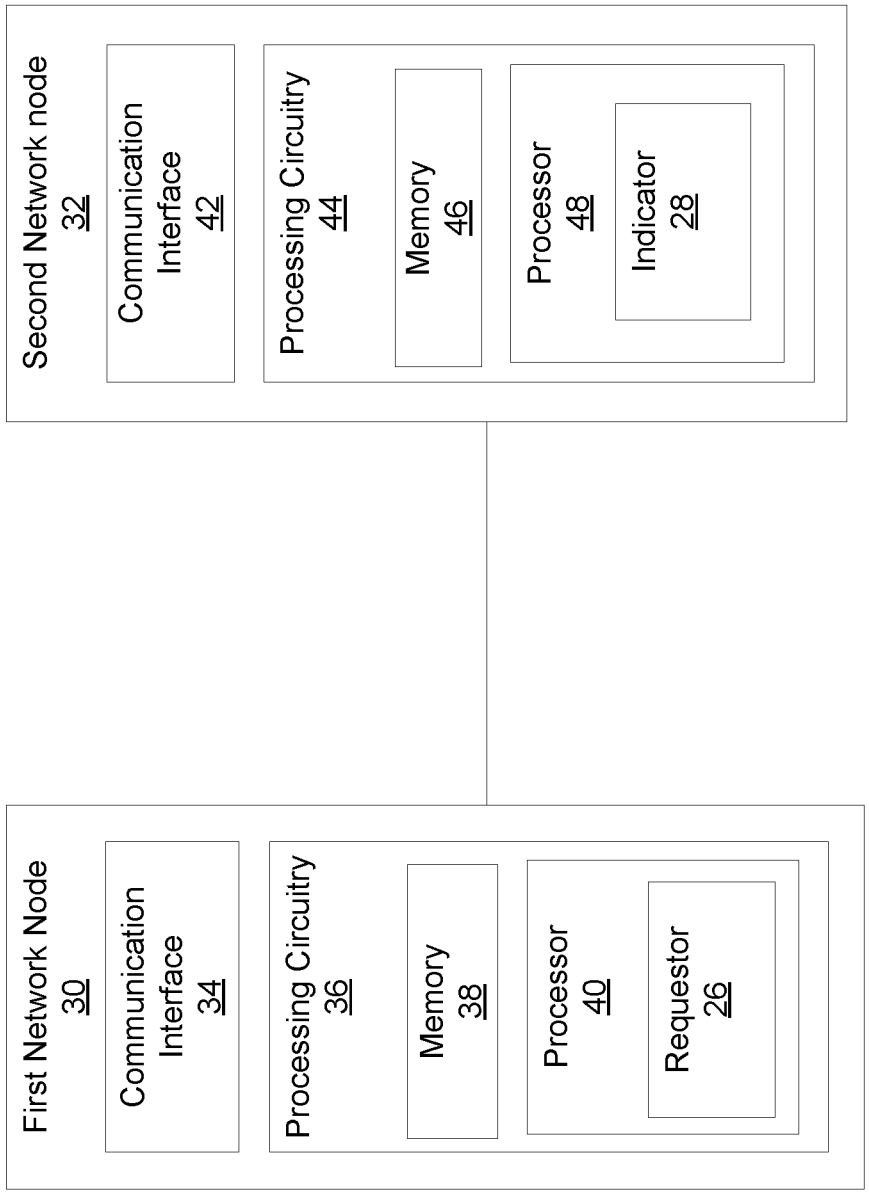
FIG. 2 illustrates yet another example system architecture and example hardware arrangements for devices in the system, according to some embodiments of the present disclosure.

In FIG. 2, the connection between the first network node 30 and the second network node 32 is shown without explicit reference to any intermediary devices or connections. However, it should be understood that intermediary devices and/or connections may exist between these devices, although not explicitly shown.

Although FIG. 2 shows requestor 26 and indicator 28, as being within a respective processor, it is contemplated that these elements may be implemented such that a portion of the elements is stored in a corresponding memory within the processing circuitry. In other words, the elements may be implemented in hardware or in a combination of hardware and software within the processing circuitry.

Figure 3:
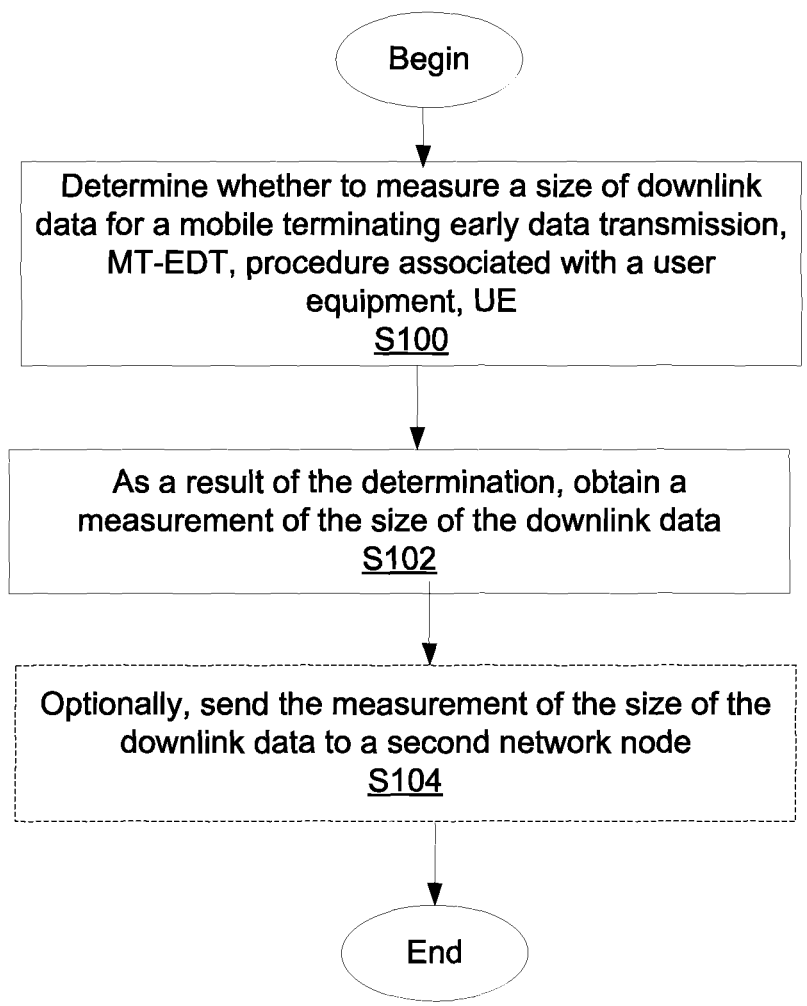
FIG. 3 is a flowchart of an exemplary process in a first network node according to some embodiments of the present disclosure.

FIG. 3 is a flowchart of an exemplary process in a first network node 30 (e.g., an AMF node, an SMF node, a UPF node, an MME node and/or a gateway node, etc.) according to one or more of the techniques in the present disclosure. One or more Blocks and/or functions and/or methods performed by the first network node 30 may be performed by one or more elements of first network node 30 such as by requestor 26 in processing circuitry 36, memory 38, processor 40, communication interface 34, etc. according to the example method. The method includes determining (Block S100), such as via requestor 26, processing circuitry 36, memory 38, processor 40 and/or communication interface 34, whether to measure a size of downlink data for a mobile terminating early data transmission, MT-EDT, procedure associated with a user equipment, UE 22. The method includes as a result of the determination, obtaining (Block S102), such as via requestor 26, processing circuitry 36, memory 38, processor 40 and/or communication interface 34, a measurement of the size of the downlink data. The method includes optionally, sending (Block S104), such as via requestor 26, processing circuitry 36, memory 38, processor 40 and/or communication interface 34, the measurement of the size of the downlink data to a second network node.

In some embodiments, determining whether to measure the size of the downlink data for the UE 22 comprises determining, such as via requestor 26, processing circuitry 36, memory 38, processor 40 and/or communication interface 34, whether to measure the size of the downlink data associated with the UE 22 based at least in part on at least one of a policy, a subscription parameter associated with the UE 22 and a traffic profile in the subscription parameter indicating a single packet transmission for the UE 22. In some embodiments, obtaining the measurement of the size of the downlink data comprises sending, such as via requestor 26, processing circuitry 36, memory 38, processor 40 and/or communication interface 34, a downlink data size measurement indication, the downlink data size measurement indication indicating to measure the size of the downlink data associated with the UE 22; and as a result of sending the downlink data size measurement indication, receiving, such as via requestor 26, processing circuitry 36, memory 38, processor 40 and/or communication interface 34, the measurement of the size of the downlink data from a third network node.

In some embodiments, the third network node is a serving gateway node and the network node is a mobility management entity, MME, node. In some embodiments, the third network node is a session management function, SMF, node and the network node is an access and mobility management function, AMF, node. In some embodiments, the measurement of the size of the downlink data associated with the UE 22 is performed one of: at the third network node; and as a result of a configuration by the third network node to perform the measurement at a fourth network node, the fourth network node being a user plane function, UPF, node. In some embodiments, obtaining the measurement of the size of the downlink data comprises sending, such as via requestor 26, processing circuitry 36, memory 38, processor 40 and/or communication interface 34, a downlink data size measurement indication in a create session request message.

In some embodiments, obtaining the measurement of the size of the downlink data comprises sending, such as via requestor 26, processing circuitry 36, memory 38, processor 40 and/or communication interface 34, a downlink data size measurement indication in a packet data unit, PDU, session establishment procedure message; and the PDU session establishment procedure message includes at least one of a create session management context message, an update session management context message, a session establishment request message and a session modification request message. In some embodiments, sending the measurement of the size of the downlink data to the second network node comprises sending, such as via requestor 26, processing circuitry 36, memory 38, processor 40 and/or communication interface 34, the measurement of the size of the downlink data to a radio access network, RAN, node. In some embodiments, the size of the downlink data being used at a radio access network, RAN, node to determine whether to indicate to the UE 22 to perform the MT-EDT procedure. In some embodiments, the MT-EDT procedure being a radio resource control, RRC, procedure.

Figure 4:
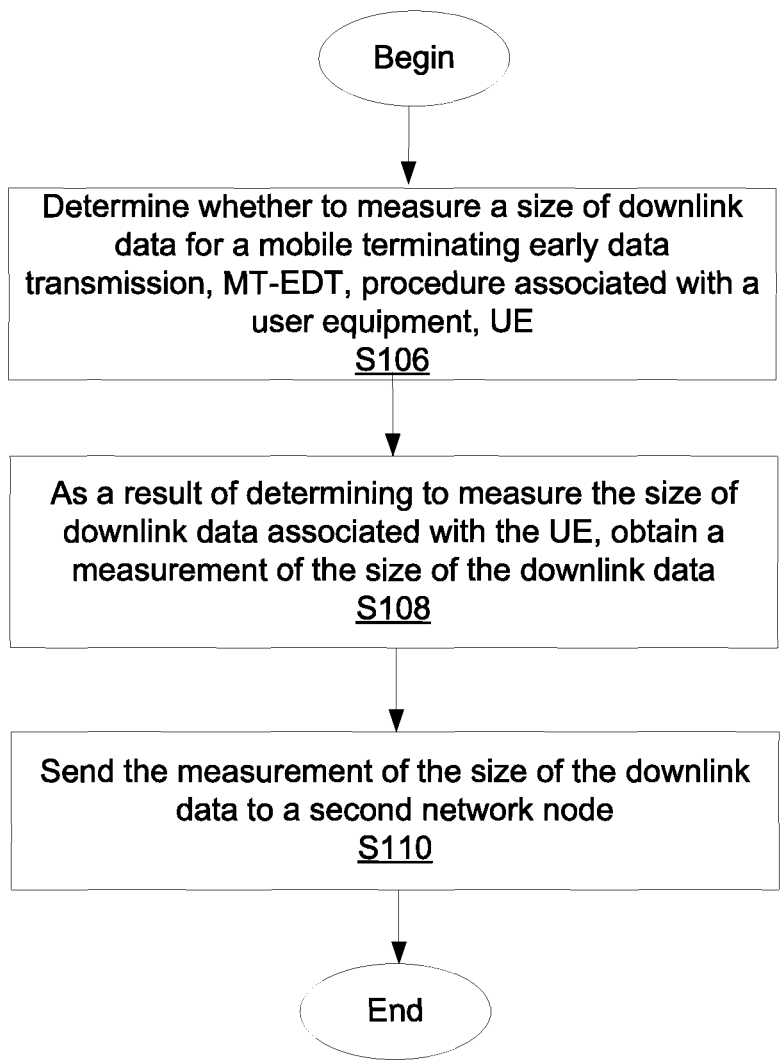
FIG. 4 is a flowchart of an exemplary process in a second network node according to some embodiments of the present disclosure.

FIG. 4 is a flowchart of an exemplary process in a second network node 32 (e.g., an AMF node, an SMF node, a UPF node, an MME node and/or a gateway node, etc.) according to one or more of the techniques in the present disclosure. One or more Blocks and/or functions and/or methods performed by the second network node 32 may be performed by one or more elements of second network node 32 such as by indicator 28 in processing circuitry 44, memory 46, processors 48, communication interface 42, etc. according to the example method. The example method includes determining (Block S106), such as via indicator 28, processing circuitry 44, memory 46, processors 48 and/or communication interface 42, whether to measure a size of downlink data for a mobile terminating early data transmission, MT-EDT, procedure associated with a user equipment, UE 22. The method includes as a result of determining to measure the size of downlink data associated with the UE 22, obtaining (Block S108), such as via indicator 28, processing circuitry 44, memory 46, processors 48 and/or communication interface 42, a measurement of the size of the downlink data. The method includes sending (Block S110), such as via indicator 28, processing circuitry 44, memory 46, processors 48 and/or communication interface 42, the measurement of the size of the downlink data to a second network node.

In some embodiments, determining whether to measure the size of the downlink data associated with the UE 22 comprises receiving, such as via indicator 28, processing circuitry 44, memory 46, processors 48 and/or communication interface 42, a downlink data size measurement indication, the downlink data size measurement indication indicating to measure the size of the downlink data associated with the UE 22; and the measurement of the size of the downlink data is based at least in part on at least one of a policy, a subscription parameter associated with the UE 22 and a traffic profile in the subscription parameter indicating a single packet transmission for the UE 22. In some embodiments, the network node is a serving gateway node and the downlink data size measurement indication is received in one of a create session request message and an update session request message from a mobility management entity, MME, node.

In some embodiments, the network node is a session management function, SMF, node and the downlink data size measurement indication is received in one of a packet data unit, PDU, session establishment procedure message and a packet data unit, PDU, session modification procedure message from an access and mobility management function, AMF, node. In some embodiments, the size of the downlink data being used by a radio access node, RAN, to determine use of the MT-EDT procedure. In some embodiments, obtaining the measurement of the size of the downlink data comprises, as a result of determining to measure the size of downlink data associated with the UE 22, one of measuring, such as via indicator 28, processing circuitry 44, memory 46, processors 48 and/or communication interface 42, the size of the downlink data received from a Packet Data Network, PDN, gateway for the UE 22 and configuring, such as via indicator 28, processing circuitry 44, memory 46, processors 48 and/or communication interface 42, a third network node to measure the size of the downlink data received from the PDN gateway for the UE 22.

In some embodiments, measuring the size of the downlink data comprises measuring, such as via indicator 28, processing circuitry 44, memory 46, processors 48 and/or communication interface 42, the size of the downlink data associated with the UE 22 as a result of a user plane interface not being active for the UE 22. In some embodiments, the user plane interface is one of an S1-U interface and a N3 interface. In some embodiments, sending the measurement of the size of the downlink data to the second network node comprises sending, such as via indicator 28, processing circuitry 44, memory 46, processors 48 and/or communication interface 42, the measurement of the size of the downlink data in a downlink data notification, DDN, request to a mobility management node. In some embodiments, at least one of: the size of the downlink data being used at a radio access network, RAN, node to determine whether to indicate to the UE 22 to perform the MT-EDT procedure; and the MT-EDT procedure being a radio resource control, RRC, procedure.

Figure 5:
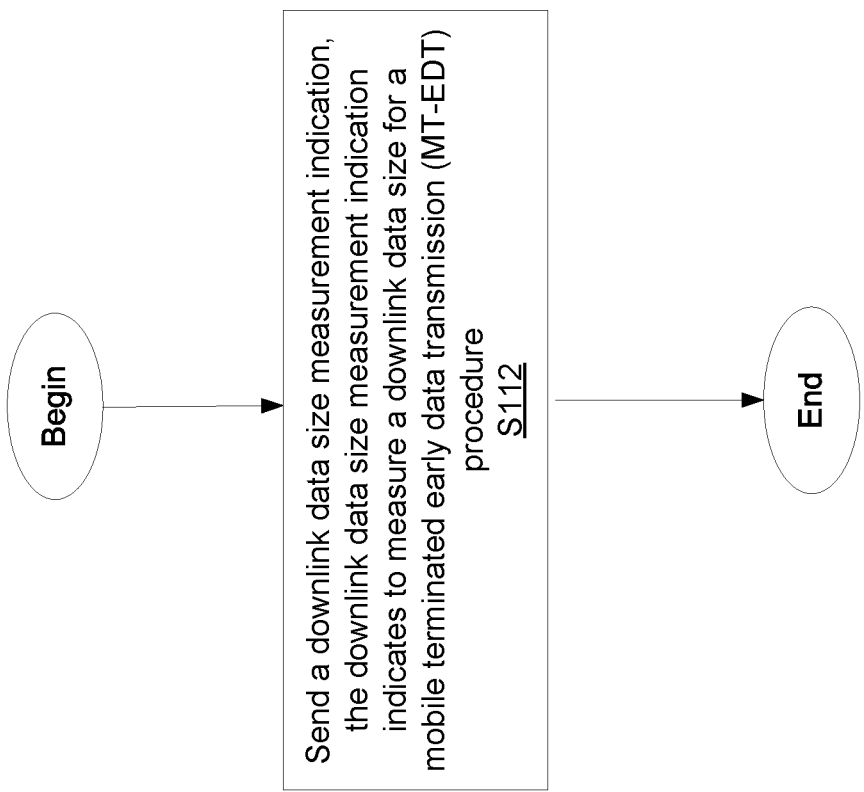
FIG. 5 is a flowchart of yet another exemplary process in a first network node according to some embodiments of the present disclosure.

FIG. 5 is a flowchart of an exemplary process in a first network node 30 (e.g., an AMF node, an SMF node, a UPF node, an MME node and/or a gateway node, etc.) for indicating to measure a downlink data size according to one or more of the techniques in the present disclosure. One or more Blocks and/or functions and/or methods performed by the first network node 30 may be performed by one or more elements of first network node 30 such as by requestor 26 in processing circuitry 36, memory 38, processor 40, communication interface 34, etc. according to the example process/method. The example process includes sending (Block S112), such as via requestor 26, processing circuitry 36, memory 38, processor 40 and/or communication interface 34, a downlink data size measurement indication, the downlink data size measurement indication indicates to measure a downlink data size for a mobile terminating early data transmission (MT-EDT) procedure.

In some embodiments, the first network node 30 may include/be an MME node 18 and may send, from the MME node 18 to a serving gateway node, the downlink data size measurement indication in a create session request message. In some embodiments, the downlink data size measurement indication is sent, such as via requestor 26, processing circuitry 36, memory 38, processor 40 and/or communication interface 34, in at least one of: the create session request message of a user equipment initial attach procedure; and the create session request message of a tracking area update procedure in which there is a change in the serving gateway.

In some embodiments, the first network node 30 may include/be an AMF node 12 or an SMF node 14 and may send, such as via requestor 26, processing circuitry 36, memory 38, processor 40 and/or communication interface 34, the downlink data size measurement indication in a PDU session establishment procedure. In some embodiment, sending further includes sending, such as via requestor 26, processing circuitry 36, memory 38, processor 40 and/or communication interface 34, from the AMF node 12 to the SMF node 14, the downlink data size measurement indication in one of a create session management context message and an update session management context message. In some embodiments, sending may include sending, such as via requestor 26, processing circuitry 36, memory 38, processor 40 and/or communication interface 34, from the SMF node 14 to a UPF node 16, the downlink data size measurement indication in a session establishment/modification request message.

In some embodiments, sending the downlink data size measurement indication further includes including, such as via requestor 26, processing circuitry 36, memory 38, processor 40 and/or communication interface 34, the downlink data size measurement indication in at least one of a create session request message, a create session management context message and an update session management context message, when a traffic profile in a subscription parameter indicates a single packet transmission.

Figure 6:
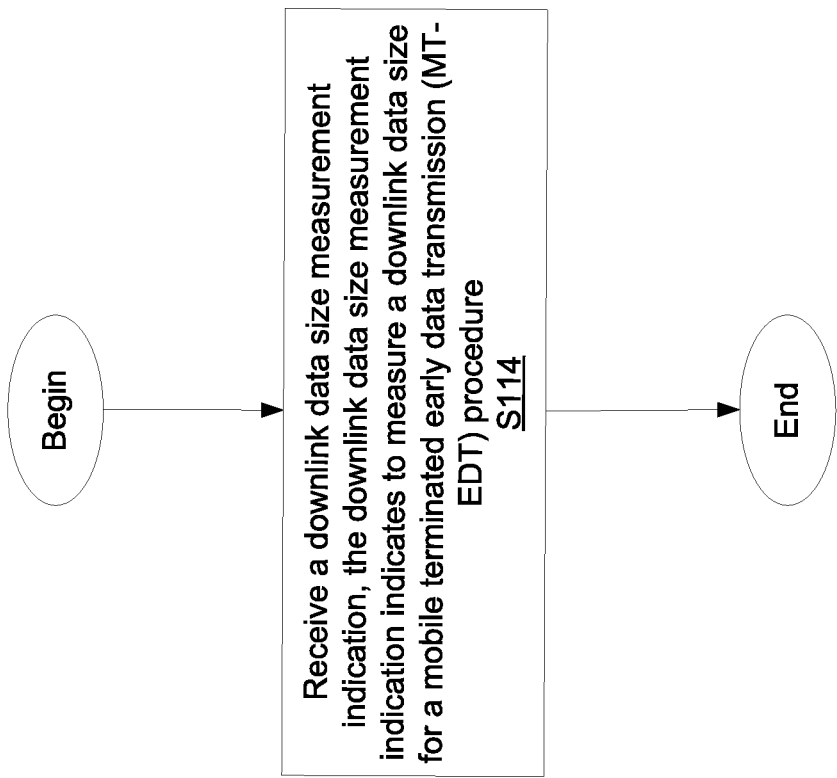
FIG. 6 is a flowchart of yet another exemplary process in a second network node according to some embodiments of the present disclosure.

FIG. 6 is a flowchart of an exemplary process in a second network node 32 (e.g., an AMF node, an SMF node, a UPF node, an MME node and/or a gateway node, etc.) for receiving an indication to measure a downlink data size according to one or more of the techniques in the present disclosure. One or more Blocks and/or functions and/or methods performed by the second network node 32 may be performed by one or more elements of second network node 32 such as by indicator 28 in processing circuitry 44, memory 46, processors 48, communication interface 42, etc. according to the example process/method. The example process includes receiving (Block S114), such as via indicator 28, processing circuitry 44, memory 46, processors 48 and/or communication interface 42, a downlink data size measurement indication, the downlink data size measurement indication indicates to measure a downlink data size for a mobile terminating early data transmission (MT-EDT) procedure.

In some embodiments, the second network node 32 may include/be a serving gateway and may receive, such as via indicator 28, processing circuitry 44, memory 46, processors 48 and/or communication interface 42, from the MME node 18, the downlink data size measurement indication in a create session request message. In some embodiment, the downlink data size measurement indication is received in
    a create session request message of a user equipment initial attach procedure. In some embodiment, the downlink data size measurement indication is received in a create session request message of a tracking area update procedure in which there is a change in the serving gateway.

In some embodiments, the second network node 32 may include/be an SMF node 14 or a UPF node 16, and may receive the downlink data size measurement indication in a PDU session establishment procedure. In some embodiments, receiving further includes receiving, from an AMF node 12, the downlink data size measurement indication in one of a create session management context message and an update session management context message. In some embodiments, the receiving further includes receiving, from the SMF node 14, the downlink data size measurement indication in a session establishment/modification request message.

In some embodiments, the second network node 32 may, as a result of receiving the downlink data size measurement indication, measure a downlink data size and/or send, such as via indicator 28, processing circuitry 44, memory 46, processors 48 and/or communication interface 42, the measured the downlink data size in e.g., a Downlink Data Notification (DDN) request message sent to at least one of an MME node and an AMF node. In some embodiments, the method further includes, as a result of receiving the downlink data size measurement indication, configuring, such as via indicator 28, processing circuitry 44, memory 46, processors 48 and/or communication interface 42, a user plane in a serving gateway node to measure a size of downlink data received from a PDN gateway when an S1-U interface is not active and/or a Downlink Data Notification (DDN) request is to be sent to an MME node. In some embodiments, the method further includes, as a result of receiving the downlink data size measurement indication, configuring, such as via indicator 28, processing circuitry 44, memory 46, processors 48 and/or communication interface 42, a UPF node to measure a size of downlink data received from a PDN gateway when an N3 interface is not active and/or a Downlink Data Notification (DDN) request message is to be sent to an AMF node.

Having generally described arrangements for supporting configuration of downlink data measurement for mobile terminating early data transmission (MT-EDT) procedures, a more detailed description of some of the embodiments are provided as follows with reference to the call flow diagrams in FIGS. 7-9, and which may be implemented by AMF node 12, SMF node 14, UPF node 16, MME node 18 and a gateway node 20 and/or more generally the first network node 30 and/or second network node 32.

Initial Attach Procedure

Figure 7:
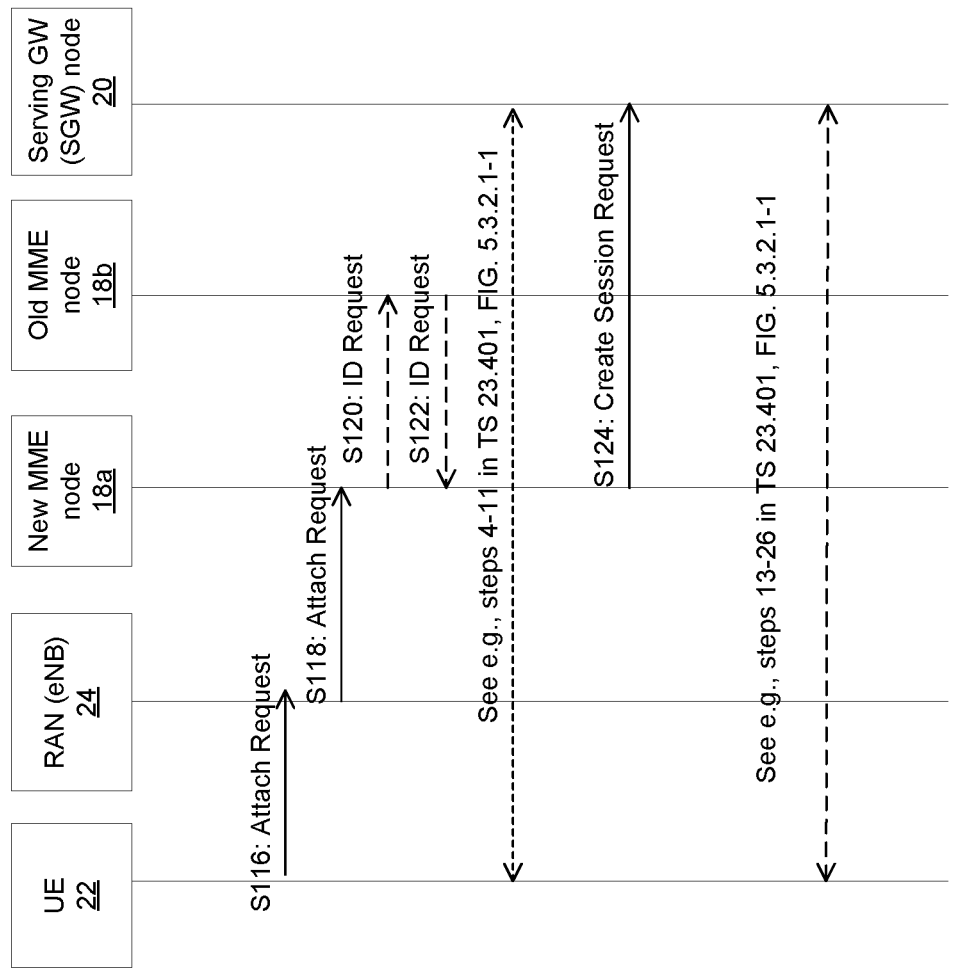
FIG. 7 illustrates an example of an initial attach procedure using a data measurement indication according to one embodiment of the present disclosure.

One example of the use of the indication (e.g., downlink data size measurement indication) to support EDT according to some embodiments of the present disclosure is illustrated in the call flow diagram of FIG. 7. FIG. 7 may represent an example initial attach procedure using the downlink data size measurement indication for e.g., EPS to support configuration of downlink data measurement for MT-EDT, as described in the steps below.

A UE 22 may register with the network to receive services that require registration. This registration may be described as Network Attachment. In step S116, the UE 22 may send an Attach Request message to an RAN 24 (e.g., eNodeB). The eNodeB may send the Attach Request message to a new MME node 18a in step S118. The MME node 18a may send an identification (ID) request to and receive an ID response from a previous MME node 18b in steps S120 and S122, respectively. The attachment procedure may proceed according to e.g., known procedures (e.g., identification, authentication, security, location requests and acknowledgements, etc. as for example in steps 4-11 in 3GPP Technical Specification (TS) 23.401, version (V) 16.4.0, section 5.3.2, FIG. 5.3.2.1-1: Attach Procedure).

In step S124, the MME node 18a may select a serving gateway (SGW) node 20 and/or may send a create session request message to the serving gateway node 20. The create session request message may include a downlink data size measurement indication. The downlink data size measurement indication may indicate to the serving gateway node 20 to measure a downlink (DL) data size for a mobile terminating early data transmission (MT-EDT) procedure. In some embodiments, the MME node 18a may include the downlink data size measurement indication in the Create Session Request message when the Traffic Profile in the subscription Communication Pattern parameters indicates "single packet transmission (DL)". The serving gateway node 20 that receives the downlink data size measurement indication may configure the user plane in the serving gateway node 20 to measure the size of the DL data received from a Packet Data Network (PDN) Gateway (GW) when e.g., the S1-U (S1 user-plane interface, which may connect the eNodeB to the Evolved Packet Core) is not active and a Downlink Data Notification (DDN) Request has to be sent to the MME node 18a. The serving gateway node 20 may include the DL data size in the Downlink Data Notification (DDN) Request sent to the MME node 18a.

The remaining steps in FIG. 7 for the attach procedure may continue according to, e.g., known attach procedures (e.g., session creation, RRC connection, initial context setup, bearer modification, etc. for example in steps 13-26 in 3GPP TS 23.401, V 16.4.0, section 5.3.2, FIG. 5.3.2.1-1: Attach Procedure), except that the network, e.g., serving gateway node 20 may be able to determine when and/or whether or not to measure the downlink data size to support MT-EDT according to the techniques in the present disclosure.

In some embodiments, as a result of the serving gateway node 20 including the DL data size in the Downlink Data Notification (DDN) Request sent to the MME node 18a, when a paging occasion is reached, the MME node 18a may send a paging request to the RAN 24. The MME node 18a may include the DL data size in the paging request message. The RAN 24 may then send a paging message to the UE 22. The paging message may include the downlink data size measurement indication if e.g., the DL data size is considered to fit into an EDT container. The UE 22 may then send an RRC message (resume ID) with consideration of the MT-EDT indication received in the paging message. When the RAN 24 receives buffered DL data from e.g., the SGW node 20, the RAN 24 may check the size again and then proceed with the MT-EDT data transmission by sending an RRC message with the DL EDT data included.

TAU Procedure

Figure 8:
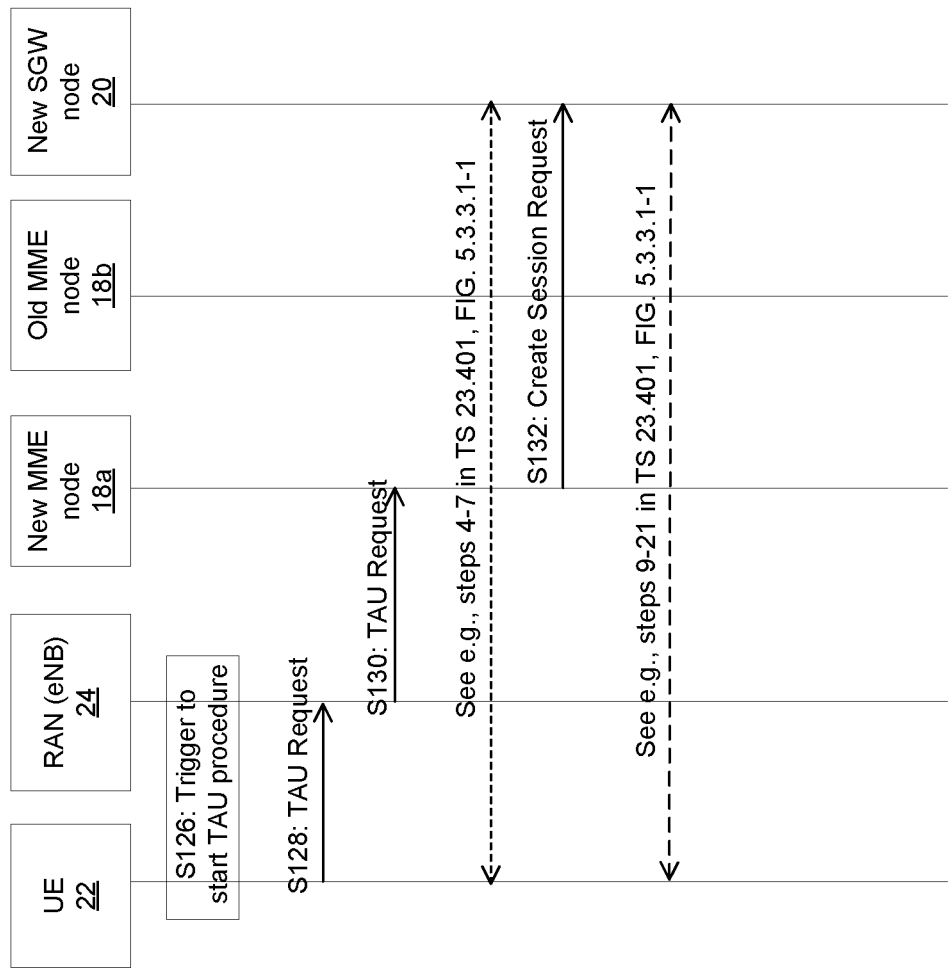
FIG. 8 illustrates an example tracking area update procedure having a changing serving gateway that uses a data measurement indication according to some embodiments of the present disclosure.

Another example of the use of the indication (e.g., downlink data size measurement indication) to support EDT according to some embodiments of the present disclosure is illustrated in the call flow diagram of FIG. 8. FIG. 8 may represent an example tracking area update (TAU) procedure in which there is a change in the serving gateway that uses the downlink data size measurement indication for e.g., EPS to support configuration of downlink data measurement for MT-EDT, as described in the steps below.

In step S126, a trigger for starting a TAU procedure may occur at the UE 22. In step S128, the UE 22 may initiate the TAU procedure by sending a TAU request message to the RAN 24 (e.g., eNodeB). In step S130, the RAN 24 may forward the TAU request to an MME node 18a. The TAU procedure may proceed according to known procedures (e.g., context request, authentication, security, etc. as for example in steps 4-7 in 3GPP TS 23.401, V 16.4.0, section 5.3.3, FIG. 5.3.3.1-1: TAU procedure with serving gateway change).

In step S132, the MME node 18a may select a serving gateway node 20 and/or may send a create session request message to the serving gateway node 20. The create session request message may include a downlink data size measurement indication. The downlink data size measurement indication may indicate to the serving gateway node 20 to measure a downlink (DL) data size for a mobile terminating early data transmission (MT-EDT) procedure. In some embodiments, the MME node 18a may include the downlink data size measurement indication in the Create Session Request message when the Traffic Profile in the subscription Communication Pattern parameters indicates "single packet transmission (DL)". The serving gateway node 20 that receives the downlink data size measurement indication may configure the user plane in the serving gateway node 20 to measure the size of the DL data received from a Packet Data Network (PDN) Gateway (GW) when, e.g., the S1-U (S1 user-plane interface, which may connect the eNodeB to the Evolved Packet Core) is not active and a Downlink Data Notification (DDN) Request has to be sent to the MME node 18a. The serving gateway node 20 may include the DL data size in the Downlink Data Notification (DDN) Request sent to the MME node 18a.

The TAU procedure may continue according to, e.g., known TAU procedures (e.g., session creation, update location, release, etc. for example in steps 9-21 in 3GPP TS 23.401, V 16.4.0, section 5.3.3, FIG. 5.3.3.1-1: TAU procedure with serving gateway change), except that the network, e.g., serving gateway node 20 may be able to determine when and/or whether or not to measure the downlink data size to support MT-EDT according to the techniques in the present disclosure.

PDU Session Establishment Procedure

Figure 9:
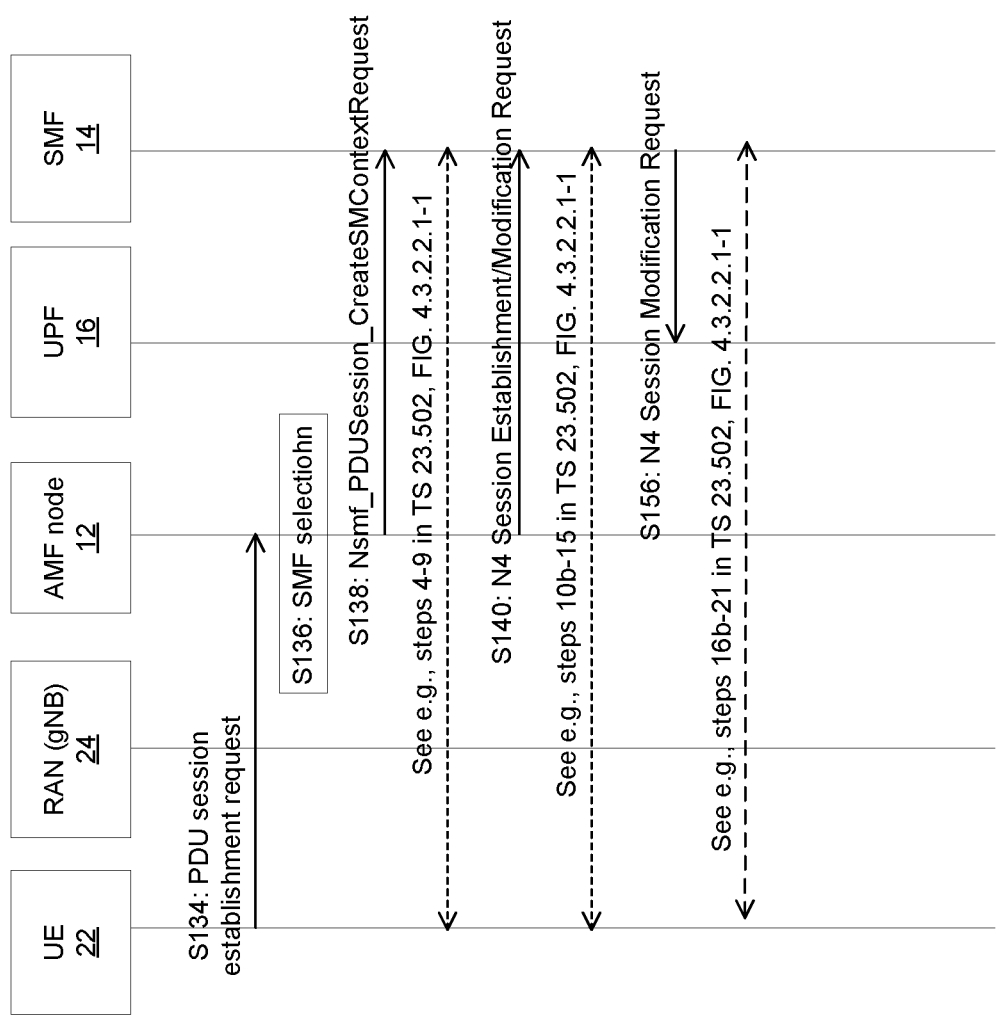
FIG. 9 illustrates an example of a PDU session establishment procedure using a data measurement indication according to some embodiments of the present disclosure.

Yet another example of the use of the indication (e.g., downlink data size measurement indication) to support EDT according to some embodiments of the present disclosure is illustrated in the call flow diagram of FIG. 9. FIG. 9 may represent an example PDU session establishment procedure that uses the downlink data size measurement indication for e.g., 5G/NR to support configuration of downlink data measurement for MT-EDT, as described in the steps below.

In step S134, the UE 22 may initiate a PDU session establishment by sending a PDU session establishment request message to the AMF node 12. In step S136, the AMF node 12 may select an SMF node 14 for the session. In step S138, the AMF node 12 may send a PDU session create context request message (or PDU session update context request message) (e.g., Nsmf_PDUSession_CreateSMContext Request, Nsmf_PDUSession_UpdateSMContext Request) to the SMF node 14. The PDU session create session request message may include a downlink data size measurement indication. The downlink data size measurement indication may indicate to the SMF node 14 and/or UPF node 16 to measure a downlink (DL) data size for a mobile terminating early data transmission (MT-EDT) procedure. In some embodiments, the AMF node 12 includes the DL Data Size Measurement Indication in the Nsmf_PDUSession_CreateSMContext Request or the Nsmf_PDUSession_UpdateSMContext Request when the Traffic Profile in the subscription Expected UE Behavior parameters indicates "single packet transmission (DL)". In some embodiments, the SMF node 14 (e.g., (V-)SMF) that receives a DL Data Size Measurement Indication configures a UPF node 16 to measure the size of DL data received from the PDN GW when e.g., the N3 (which may be an interface between the RAN (gNB) and the (initial) UPF) is not active and a Downlink Data Notification Request has to be sent to the AMF node 12. The SMF node 14 may include the DL data size in the Downlink Data Notification Request sent to the AMF node 12.

The PDU session establishment/modification procedure may proceed according to, e.g., known procedures as shown in for example in steps 4-9 in 3GPP TS 23.502, V 16.1.1, section 4.3.3.2, FIG. 4.3.2.2.1-1: UE-requested PDU session establishment.

In step S140, the SMF node 14 sends an N4 Session Establishment/Modification Request to the UPF node 16 and may provide Packet detection, enforcement and reporting rules to be installed on the UPF node 16 for this PDU Session. The SMF node 14 may include the DL Data Size Measurement Indication in the e.g., N4 Session Establishment/Modification Request to the UPF node 16, if received from the AMF node 12.

The UPF node 16 may then be configured to measure the size of DL data received from the PDN GW when e.g., the N3 (which may be an interface between the RAN (gNB) 24 and the (initial) UPF 16) is not active and a Downlink Data Notification Request has to be sent to the AMF node 12.

The PDU session establishment/modification procedure may proceed according to e.g., known procedures as shown in for example in steps 10b-15 in 3GPP TS 23.502, V 16.1.1, section 4.3.3.2, FIG. 4.3.2.2.1-1: UE-requested PDU session establishment.

In step S156, the SMF node 14 initiates an N4 Session Modification procedure with the UPF node 16. The SMF node 14 may provide AN Tunnel information to the UPF node 16 as well as the corresponding forwarding rules. The SMF node 14 may include the DL Data Size Measurement Indication in the, e.g., N4 Session Modification request to the UPF node 16, if received from the AMF node 12. As a result of the DL Data Size Measurement indication, the UPF node 16 may be configured to measure the size of DL data received from the PDN GW. The PDU session establishment/modification procedure may proceed according to e.g., known procedures as shown in for example in steps 16b-21 in 3GPP TS 23.502, V 16.1.1, section 4.3.3.2, FIG. 4.3.2.2.1-1: UE-requested PDU session establishment.

In some embodiments, as a result of the SMF node 14 including the DL data size in the Downlink Data Notification Request sent to the AMF node 12, e.g., when there is a paging occasion, the AMF node 12 may send a paging request to the RAN 24 (e.g., NG-RAN). The AMF node 12 may include the downlink data size measurement indication in the paging request. The RAN 24 (e.g., NG-RAN) may forward the paging request with the downlink data size measurement indication to the UE 22. The UE 22 may send an RRC message for EDT to the RAN 24. The RAN 24 may then send an RRC message including the DL EDT to the UE 22.

PDU Session Messages

In some embodiments, the PDU session messages and/or service operations may be updated to accept as input, the downlink data size measurement indication of the present disclosure. For example, Nsmf_PDUSession_CreateSMContext and Nsmf_PDUSession_UpdateSMContext may be updated to accept as input, the downlink data size measurement indication of the present disclosure.

Some embodiments of the present disclosure provide for a new indication that allows the SGW and/or UPF and/or SMF to determine whether or not DL data size measurements should be made (e.g., by the SGW/UPF/SMF) and/or may provide an indication to measure a downlink data size for a mobile terminating early data transmission procedure.

In some embodiments, the MT-EDT is only used at "Single Packet Transmission (UL)" to reduce signalling. In some embodiments, the MT-EDT can also be used at "Dual Packet Transmission (DL+UL)". However, the signalling reduction may be much less, and the solution complexity may be higher, as compared to the single packet transmission embodiment.

It should be understood that although the example embodiments discussed herein may use one or another type of message or one or another network node arrangement or context, the techniques disclosed herein may be used with other types of messages or other types of network architecture arrangements or other contexts, to support EDT according to the techniques provided in this disclosure.

Some embodiments may include one or more of the following:

Embodiment A1. A method (MME/AMF or alt. SMF/UPF does it itself) implemented in a network node, the method comprising:
  sending a downlink data size measurement indication, the downlink data size measurement indication indicates to measure a downlink data size for a mobile terminating early data transmission (MT-EDT) procedure;

Embodiment A2. The method of Embodiment A1, wherein sending further comprises sending, from an MME node to a serving gateway node, the downlink data size measurement indication in a create session request message.

Embodiment A3. The method of any one of Embodiments A1 and A2, wherein the downlink data size measurement indication is sent in at least one of:
  the create session request message of a user equipment initial attach procedure; and
  the create session request message of a tracking area update procedure in which there is a change in the serving gateway.

Embodiment A4. The method of Embodiment A1, wherein sending further comprises sending the downlink data size measurement indication in a PDU session establishment procedure.

Embodiment A5. The method of Embodiment A4, wherein sending further comprises at least one of:
  sending, from an AMF node to an SMF node, the downlink data size measurement indication in one of a create session management context message and an update session management context message; and/or
  sending, from the SMF node to a UPF node, the downlink data size measurement indication in a session establishment/modification request message.

Embodiment A6. The method of any one of Embodiments A1-A5, wherein sending the downlink data size measurement indication further comprises:
  including the downlink data size measurement indication in at least one of a create session request message, a create session management context message and an update session management context message, when a traffic profile in a subscription parameter indicates a single packet transmission.

Embodiment B1. A network node comprising processing circuitry, the processing circuitry configured to cause the network node to:
  send a downlink data size measurement indication, the downlink data size measurement indication indicates to measure a downlink data size for a mobile terminating early data transmission (MT-EDT) procedure.

Embodiment B2. The network node of Embodiment B1, wherein the processing circuitry is further configured to cause the network node to send by being configured to cause the network node to:
  send, from an MME node to a serving gateway node, the downlink data size measurement indication in a create session request message.

Embodiment B3. The network node of any one of Embodiments B1 and B2, wherein the downlink data size measurement indication is sent in at least one of:
  the create session request message of a user equipment initial attach procedure; and
  the create session request message of a tracking area update procedure in which there is a change in the serving gateway.

Embodiment B4. The network node of Embodiment B1, wherein the processing circuitry is further configured to cause the network node to send by being configured to cause the network node to:
  send the downlink data size measurement indication in a PDU session establishment procedure.

Embodiment B5. The network node of Embodiment B4, wherein the processing circuitry is further configured to cause the network node to send by being configured to cause the network node to at least one of:
  send, from an AMF node to an SMF node, the downlink data size measurement indication in one of a create session management context message and an update session management context message; and/or
  send, from the SMF node to a UPF node, the downlink data size measurement indication in a session establishment/modification request message.

Embodiment B6. The network node of any one of Embodiments B1-B5, wherein the processing circuitry is further configured to cause the network node to send by being configured to cause the network node to:
  include the downlink data size measurement indication in at least one of a create session request message, a create session management context message and an update session management context message, when a traffic profile in a subscription parameter indicates a single packet transmission.

Embodiment C1. A method implemented in a network node, the method comprising:
  receiving a downlink data size measurement indication, the downlink data size measurement indication indicates to measure a downlink data size for a mobile terminating early data transmission (MT-EDT) procedure.

Embodiment C2. The method of Embodiment C1, wherein receiving further comprises receiving, from an MME node, the downlink data size measurement indication in a create session request message.

Embodiment C3. The method of any one of Embodiments C1 and C2, wherein the downlink data size measurement indication is received in at least one of:
  the create session request message of a user equipment initial attach procedure; and
  the create session request message of a tracking area update procedure in which there is a change in the serving gateway.

Embodiment C4. The method of Embodiment C1, wherein receiving further comprises receiving the downlink data size measurement indication in a PDU session establishment procedure.

Embodiment C5. The method of Embodiment C4, wherein receiving further comprises at least one of:
  receiving, from an AMF node, the downlink data size measurement indication in one of a create session management context message and an update session management context message; and/or
  receiving, from an SMF node, the downlink data size measurement indication in a session establishment/modification request message.

Embodiment C6. The method of any one of Embodiments C1-C5, further comprising:

as a result of receiving the downlink data size measurement indication, measuring a downlink data size and/or sending the measured the downlink data size in a Downlink Data Notification (DDN) request message sent to at least one of an MME node and an AMF node.

Embodiment C7. The method of any one of Embodiments C1-C6, further comprising at least one of:

as a result of receiving the downlink data size measurement indication, configuring a user plane in a serving gateway node to measure a size of downlink data received from a PDN gateway when an S1-U interface is not active and/or a Downlink Data Notification (DDN) request is to be sent to an MME node; and/or as a result of receiving the downlink data size measurement indication, configuring a UPF node to measure a size of downlink data received from a PDN gateway when an N3 interface is not active and/or a Downlink Data Notification (DDN) request message is to be sent to an AMF node.

Embodiment D1. A network node comprising processing circuitry, the processing circuitry configured to cause the network node to:

receive a downlink data size measurement indication, the downlink data size measurement indication indicates to measure a downlink data size for a mobile terminating early data transmission (MT-EDT) procedure.

Embodiment D2. The network node of Embodiment D1, wherein the processing circuitry is further configured to cause the network node to receive by being configured to cause the network node to:

receive, from an MME node, the downlink data size measurement indication in a create session request message.

Embodiment D3. The network node of any one of Embodiments D1 and D2, wherein the downlink data size measurement indication is received in at least one of:

the create session request message of a user equipment initial attach procedure; and the create session request message of a tracking area update procedure in which there is a change in the serving gateway.

Embodiment D4. The network node of Embodiment D1, wherein the processing circuitry is further configured to cause the network node to receive by being configured to cause the network node to:

receive the downlink data size measurement indication in a PDU session establishment procedure.

Embodiment D5. The network node of Embodiment D4, wherein the processing circuitry is further configured to cause the network node to receive by being configured to cause the network node to:

receive, from an AMF node, the downlink data size measurement indication in one of a create session management context message and an update session management context message; and/or receive, from an SMF node, the downlink data size measurement indication in a session establishment/ modification request message.

Embodiment D6. The network node of any one of Embodiments D1-D5, wherein the processing circuitry is further configured to cause the network node to:

as a result of receiving the downlink data size measurement indication, measure a downlink data size and/or send the measured downlink data size in a Downlink Data Notification (DDN) request message sent to at least one of an MME node and an AMF node.

Embodiment D7. The network node of any one of Embodiments D1-D6, wherein the processing circuitry is further configured to cause the network node to at least one:

as a result of receiving the downlink data size measurement indication, configure a user plane in a serving gateway node to measure a size of downlink data received from a PDN gateway when an S1-U interface is not active and/or a Downlink Data Notification (DDN) request is to be sent to an MME node; and/or as a result of receiving the downlink data size measurement indication, configure a UPF node to measure a size of downlink data received from a PDN gateway when an N3 interface is not active and/or a Downlink Data Notification (DDN) request message is to be sent to an AMF node.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A non-transitory computer readable medium having stored thereon software instructions that, when executed by a processor in a network node, cause the processor to execute the steps comprising:
    determining whether to measure a size of downlink data for a mobile terminating early data transmission, MT-EDT, procedure associated with a user equipment, UE; determining whether to measure the size of the downlink data for the UE comprising determining whether to measure the size of the downlink data associated with the UE based at least in part on at least one of a policy, a subscription parameter associated with the UE, and a traffic profile in the subscription parameter indicating a single packet transmission for the UE;
    as a result of the determination, obtaining a measurement of the size of the downlink data, obtaining the measurement of the size of the downlink data compriisng: causing sending, as a result of determining to measure the size of downlink data associated with the UE, a downlink data size measurement indication to a third network node to configure the third network node to measure the size of the downlink data received from a Packet Data Network, PDN, gateway for the UE; and
    causing sending the measurement of the size of the downlink data to a second network node.

2. The non-transitory computer readable medium of claim 1, wherein the processor executing the step of obtaining the measurement of the size of the downlink data comprises:
    as a result of sending the downlink data size measurement indication, receiving the measurement of the size of the downlink data from the third network node.

3. The non-transitory computer readable medium of claim 2, wherein the third network node is a serving gateway node and the network node is a mobility management entity, MME, node.

4. The non-transitory computer readable medium of claim 2, wherein the third network node is a session management function, SMF, node and the network node is an access and mobility management function, AMF, node.

5. The non-transitory computer readable medium of claim 2, wherein the measurement of the size of the downlink data associated with the UE is performed one of:
    at the third network node; and
    as a result of a configuration by the third network node to perform the measurement at a fourth network node, the fourth network node being a user plane function, UPF, node.

6. The non-transitory computer readable medium of claim 1, wherein the processor executing the step of obtaining the measurement of the size of the downlink data comprises:
    sending a downlink data size measurement indication in a create session request message.

7. The non-transitory computer readable medium of claim 1, wherein the processor executing the step of obtaining the measurement of the size of the downlink data comprises:
    causing sending a downlink data size measurement indication in a packet data unit, PDU, session establishment procedure message; and
    wherein the PDU session establishment procedure message includes at least one of a create session management context message, an update session management context message, a session establishment request message and a session modification request message.

8. The non-transitory computer readable medium of claim 1, wherein the processor executing the step of causing sending the measurement of the size of the downlink data to the second network node comprises:
    causing sending the measurement of the size of the downlink data to a radio access network, RAN, node.

9. The non-transitory computer readable medium of claim 1, wherein at least one of:
    the size of the downlink data being used at a radio access network, RAN, node to determine whether to indicate to the UE to perform the MT-EDT procedure; and
    the MT-EDT procedure being a radio resource control, RRC, procedure.

10. A method in a network node, the method comprising:
    determining whether to measure a size of downlink data for a mobile terminating early data transmission, MT-EDT, procedure associated with a user equipment, UE determining whether to measure the size of downlink data associated with the UE comprising receiving a downlink data size measurement indication, the downlink data size measurement indication indicating to measure the size of the downlink data associated with the UE, the measurement of the size of the downlink data being based at least in part on at least on of a policy, a subscription parameter associated with the UE, and a traffic profile in the subscription parameter indicating a single packet transmission for the UE;

as a result of determining to measure the size of downlink data associated with the UE, obtaining a measurement of the size of the downlink data, obtaining the measurement of the size of the downlink data comprising, as a result of determining to measure the size of downlink data associated with the UE, configuring a third network node to measure the size of the downlink data received from a Packet Data Network, PDN, gateway for the UE; and sending the measurement of the size of the downlink data to a second network node.

11. The method of claim 10, wherein the network node is a serving gateway node and the downlink data size measurement indication is received in one of a create session request message and an update session request message from a mobility management entity, MME, node.

12. The method of claim 10, wherein the network node is a session management function, SMF, node and the downlink data size measurement indication is received in one of a packet data unit, PDU, session establishment procedure message and a packet data unit, PDU, session modification procedure message from an access and mobility management function, AMF, node.

13. The method of claim 12, wherein the size of the downlink data being used by a radio access node, RAN, to determine use of the MT-EDT procedure.

14. The method of claim 11, wherein measuring the size of the downlink data comprises:

measuring the size of the downlink data associated with the UE as a result of a user plane interface not being active for the UE.

15. The method of claim 14, wherein the user plane interface is one of an S1-U interface and a N3 interface.

16. The method of claim 10, wherein sending the measurement of the size of the downlink data to the second network node comprises:

sending the measurement of the size of the downlink data in a downlink data notification, DDN, request to a mobility management node.

17. The method of claim 10, wherein at least one of:

the size of the downlink data being used at a radio access network, RAN, node to determine whether to indicate to the UE to perform the MT-EDT procedure; and the MT-EDT procedure being a radio resource control, RRC, procedure.

* * * * *